(12) United States Patent
Floyd et al.

(10) Patent No.: US 6,802,031 B2
(45) Date of Patent: Oct. 5, 2004

(54) METHOD AND APPARATUS FOR INCREASING THE EFFECTIVENESS OF SYSTEM DEBUG AND ANALYSIS

(75) Inventors: Michael Stephen Floyd, Leander, TX (US); Larry Scott Leitner, Cedar Park, TX (US); Kevin F. Reick, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 579 days.

(21) Appl. No.: 09/864,114

(22) Filed: May 24, 2001

(65) Prior Publication Data

US 2002/0178403 A1 Nov. 28, 2002

(51) Int. Cl.[7] ............................................... G06F 11/00
(52) U.S. Cl. ........................... 714/45; 714/29; 714/39; 714/47
(58) Field of Search .............................. 714/29, 39, 45, 714/47

(56) References Cited

U.S. PATENT DOCUMENTS

| | | | | | |
|---|---|---|---|---|---|
| 5,754,827 A | * | 5/1998 | Barbier et al. | ................. | 703/14 |
| 6,094,729 A | * | 7/2000 | Mann | ........................... | 714/25 |
| 6,145,100 A | * | 11/2000 | Madduri | ...................... | 714/45 |
| 6,243,836 B1 | * | 6/2001 | Whalen | ........................ | 714/45 |
| 6,314,530 B1 | * | 11/2001 | Mann | ........................... | 714/38 |
| 6,594,185 B1 | * | 7/2003 | Takagi | ........................ | 365/195 |

* cited by examiner

*Primary Examiner*—Robert Beausoliel
*Assistant Examiner*—Emerson Puente
(74) *Attorney, Agent, or Firm*—Richard F. Frankeny; Winstead Sechrest & Minick P.C.; Casimer K. Salys

(57) ABSTRACT

A trace array for recording states of signals includes N-storage locations for k trace signals. In the write mode, an address generator combines the outputs of an event signal counter and a cycle clock counter to generate trace array addresses. A start code is written each time an event signal occurs and event addresses are saved. Recording is stopped by a stop signal and the stop address is saved. A compression code and time stamp code are written when no state changes occur in any trace signals at the cycle clock times to compress recorded trace signal data. An output processor reads out stored states of the trace signals and uses the start codes, event addresses, stop address, compression code and time stamp to reconstruct the original trace signal sequences for analysis.

36 Claims, 11 Drawing Sheets

US 6,802,031 B2

METHOD AND APPARATUS FOR INCREASING THE EFFECTIVENESS OF SYSTEM DEBUG AND ANALYSIS

TECHNICAL FIELD

The present invention relates in general to transient event recording, and in particular, to capturing the traces of execution cycles in a computer preceding an error condition or failure.

BACKGROUND INFORMATION

Transient event recorders refer to a broad class of systems that provide a method of recording, for eventual analysis, signals or events that precede an error or failure condition in logic, electronic, and electromechanical systems. Analog transient recorders have existed for years in the form of storage oscilloscopes and strip chart recorders. With the advent of low cost high speed digital systems and the availability of high speed memory, it became possible to record digitized analog signals or digital signals in a non-volatile digital memory. Two problems that have always existed in these transient event recoding systems are the speed of data acquisition and the quality of connection to signals being recorded. Transient event recording systems had to have circuits and recording means that were faster than the signals that were to be recorded, and the signal interconnection could not cause distortion or significant interference with desired signals.

Digital transient event recording systems have been particularly useful in storing and displaying multiple signal channels where only timing or state information was important and many such transient event recording systems exist commercially. With the advent of very large scale integrated circuits (VLSI), operating at high speeds, it became very difficult to employ transient event recording techniques using external instrumentation. The signals to be recorded or stored could not be contacted with an external connection without a degradation in performance. To overcome the problems of some prior trace event recorders, trace arrays have been integrated onto VLSI chips along with other functional circuits. Another problem that occurs when trying to use transient event recording techniques for VLSI circuits is that the trigger event, which actually began a process leading to a particular failure, sometimes manifests itself onto VLSI chips many cycles ahead of the observable failure event.

For hardware debugging of a logic unit in a VLSI microprocessor, a suitable set of control and/or data signals may be selected from the logic unit and put on a bus called the unit debug bus. The contents of this bus at successive cycles may be saved in a trace array. Since the size of the trace array is usually small, it can save only a few cycles of data from the debug bus. Events are defined to indicate when to start and when to stop storing information in the trace array. For example, an event trigger signal may be defined when a debug bus content matches a predetermined bit string "A". A debug bus is the name for a bus used to direct signals to a trace array. For example, bit string "A" may indicate that a cache write to a given address took place and this indication may be used to start a tracing (storing data in the trace array). Another content, for example bit string "B", may be used to stop storing in the trace array when it matches a content of the debug bus.

In some cases, the fault in the VLSI chip manifests itself at the last few occurrences of an event (for example, during one of the last times that a cache write takes place to a given address location, the cache gets corrupted). It may not be known exactly which of these last few occurrences of the event manifested the actual error, but it may be known (or suspected) that the error was due to one of the last occurrences. Sometimes there is no convenient start and stop event for storing in the trace array. Because of this, it is difficult to capture the trace that shows the desired control and data signals for the cycles immediately before the last few occurrences of the events. This may be especially true if system or VLSI behavior changes from one program run to the next.

The performance of VLSI chips is difficult to analyze and failures that are transient, with a low repetition rate, are particularly hard to analyze and correct. Analyzing and correcting design problems that manifest themselves as transient failures are further exacerbated by the fact that the event that triggers a particular failure may occur many cycles before the actual transient failure itself. There is, therefore, a need for a method and system for recording those signals that were instrumental in causing the actual transient VLSI chip failure.

SUMMARY OF THE INVENTION

A trace array is integrated onto a VLSI chip for storing and playing back a sequence of trace signal states that occurred prior to an event condition. Embodiments of the present invention allow the trace array to be simply partitioned into sub-arrays or Banks. The trace array is combined with circuits that enable trace signals to be selectively recorded to enable system debug or analysis. Addresses for the trace array are generated by combining the outputs of an event counter and a cycle clock counter. The cycle clock is selected to generate the low order bits of the trace array address and the event counter is selected to generate the high order bits of the trace array address. Program signals are used to determine how many bits of the total address are from the event counter and the cycle clock counter. The trace array may be partitioned into Banks in this manner. Each time an event signal is counted the trace array address indexes to an address in another Bank determined by the outputs of the event counter and the cycle clock counter. The cycle clock counter cycles through addresses in a selected Bank until another event signal is received. Each time the event signal occurrence causes the trace address to jump to a new Bank address, the event address is stored and a start code is recorded in the trace array at the new Bank address. Trace signals may be "masked" or selected so all trace signals or a predetermined sub-set of trace signals are monitored to determine state changes between cycle clock times. If no selected trace signal changes its state between cycle clock times, then a compression code is recorded in the trace array and the cycle clock counter is not incremented. Instead, the number of cycle clocks in which none of the trace signals change states is recorded as a time stamp in the trace array. A trace may be stopped for readout on the receipt of a stop signal which may be the result of another event such as an error condition. The trace array address corresponding to the stop signal is saved as the counters are not incremented. Each Bank within the trace array has a logic true Bank valid bit when the Bank has valid trace signal data stored. An output processor (processing function, either hardware or software) reads out the trace array and reconstructs the trace signal sequences using the event addresses, start codes, compression codes, time stamps and the implicit stop address. The output processor resets the Bank valid bits on readout. Using embodiments of the present invention, it is not necessary to know where trace recording starts in the trace array nor is it necessary to reset the address counters to enable reconstruction of the original received trace signal sequences.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
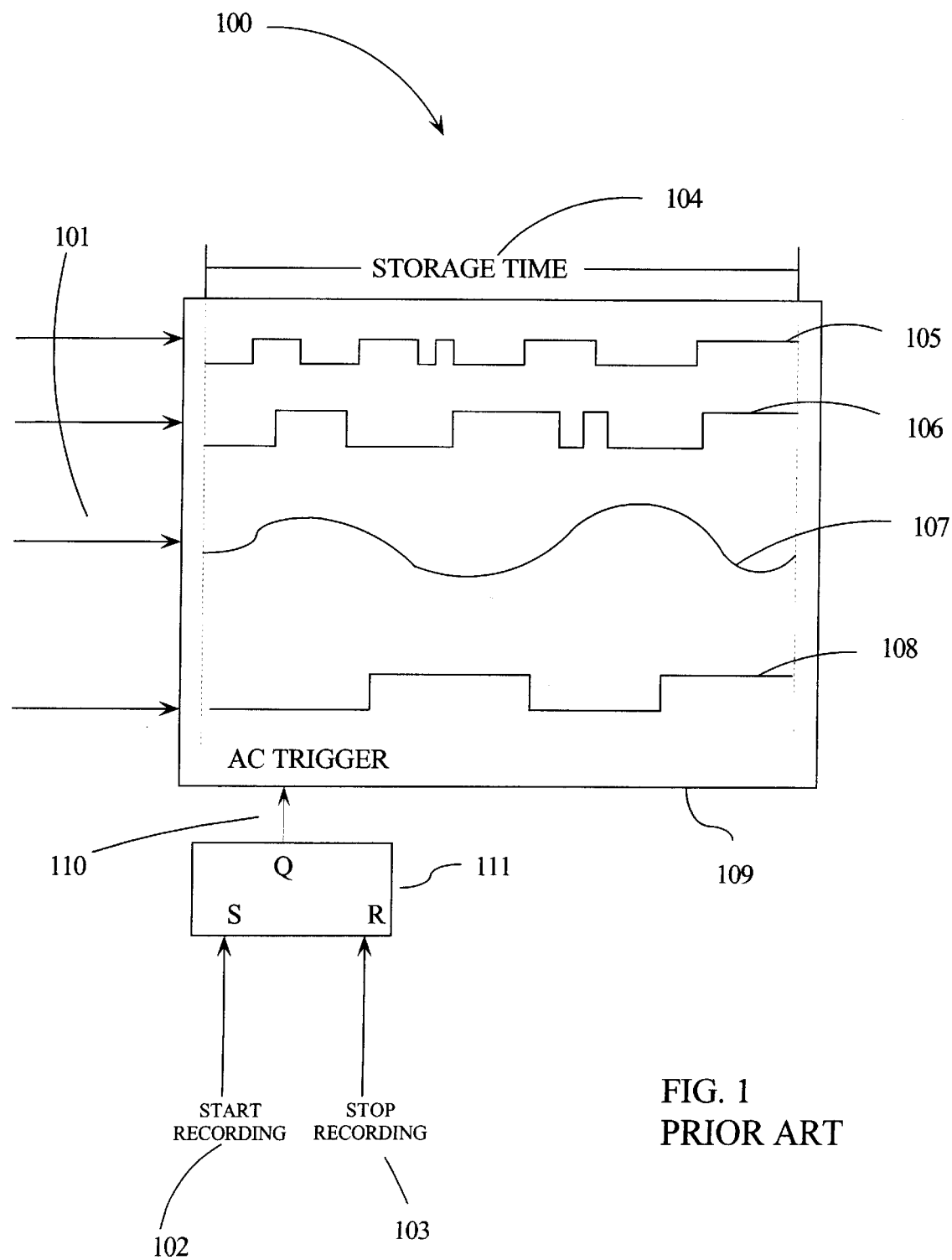
FIG. 1 is a prior art block diagram of a transient event recording system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a simple block diagram of a transient event recoding system 100 that may be found in the prior art. A transient event recorder 109 has four inputs 101 with a storage time 104. For example, transient event recorder 109 may be a storage oscilloscope with storage traces and a sweep time equal to storage time 104. Assuming latch 111 starts in a reset state, a start recording signal 102 is used to set the latch 111 generating a trigger output 110 which triggers storage oscilloscope 109. Inputs 101 will continue to record on the cathode ray tube (CRT) of storage oscilloscope 109 for the duration of the sweep time or storage time 104. If trigger 110 is an alternating current (AC) trigger requiring a transition, then the information will remain stored on the CRT until a stop recording signal 103 resets latch 111 and allows a new start recording signal 102 to again cause a transition and a new storage cycle. In this example, transient event recorder 109 is recording digital signals 105, 106 and 108 and an analog signal 107.

Figure 2:
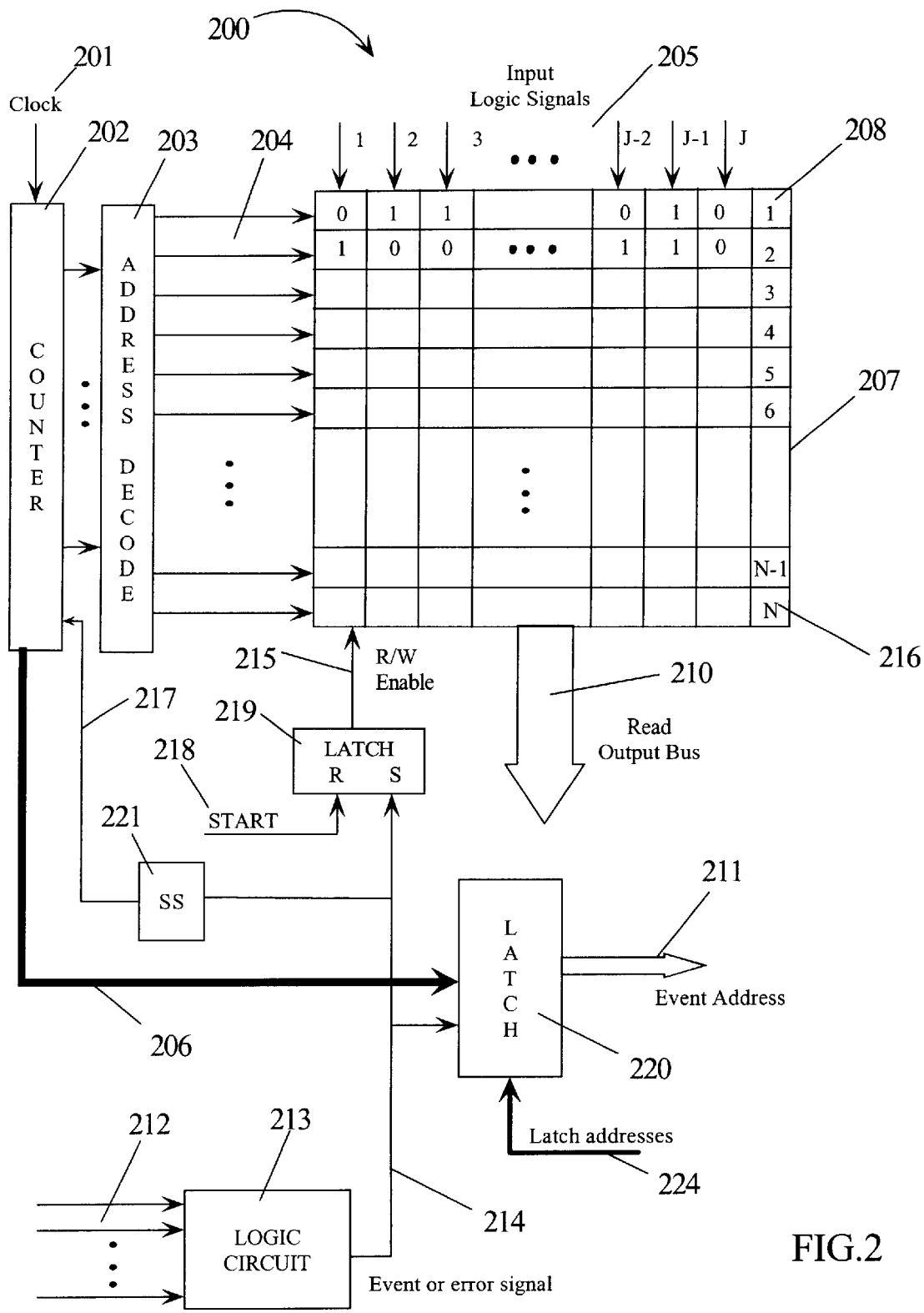
FIG. 2 is a block diagram of a transient event recording system.

FIG. 2 is a block diagram of a digital transient event recorder 200 that may be used for debugging digital circuits. A memory array (trace array) 207 has entries 208 through 216 (1 through N) and J input logic signals 205 (1 through J). The individual entries (e.g., entry 208) are addressed by address decoder 203 with address signals 204. A counter 202, for example, may be used to sequence through the N-addresses of trace array 207. Counter 202 receives clock input 201 and is configured to automatically reset to zero (entry one) and count up to (N−1) ($N^{th}$ entry) when it reaches the end of its count (N−1). In this manner, the addresses for trace array 207 cycle from one to N and then repeat. If read/write enable (R/W) 215 is set to write, then trace array 207 will record in a wrapping mode with old data being overwritten by new data. Clock 201 converts the entries one through N to a discrete time base where trace array 207 stores the states of logic input signals 205 at each discrete time of the clock 201. If read/write enable 215 is set to read, then as counter 202 causes the addresses 204 to cycle, the contents of trace array 207 may be read out in parallel via read output bus 210. If an edge triggered single shot (SS) circuit 221 is used to generate a reset 217 to counter 202 each time read/write enable 215 changed states, then counter 202 would start at a zero count (entry one) and trace array 207 would be read from or written into starting from address one. In the read mode, trace array 207 would be continuously read out cycling from entry 208 through 216 and back to entry 208. The write mode will likewise loop through the addresses and new data will overwrite old data until an error or event signal 214 resets latch 219 and trace array 207 is set to the read mode. Trace array 207 will retain the N-logic state time samples of logic inputs 205 which occurred preceding the error or event 214. The error or event 214 may be generated by a logic operation 213 on inputs 212. The outputs of counter 202 are also coupled to parallel latch 220. When error or event 214 occurs, the counter 202 outputs and thus the address of trace array 207 being written into is latched in latch 220 storing event address 211. Event address 211 may be compared to the counter output during a cyclic read of trace array 207 to determine the actual logic states of logic inputs 205 when the error or event signal 214 occurred. Event address 211 may also be stored in a circuit that may be indexed up or down around event address 211 to generate a signal to synchronize with time samples of logic input 205 before event signal 214.

Figure 3:
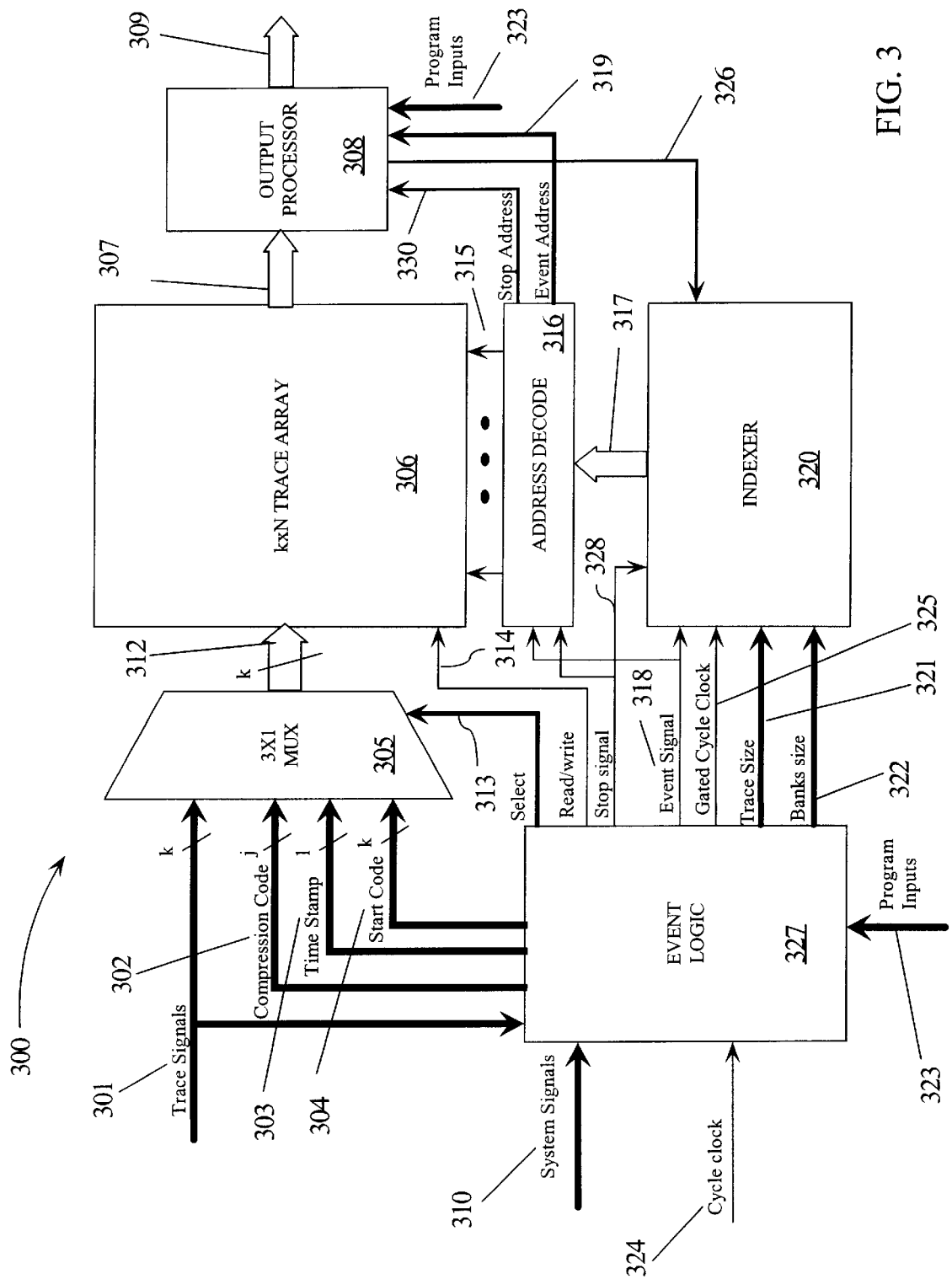
FIG. 3 is a block diagram of a transient event recording system according to one embodiment of the present invention.

FIG. 3 is a block diagram of a transient event recorder 300 using a trace array 306 according to embodiments of the present invention. Trace array 306 has k inputs (receiving k outputs 312) and is configured to store "N" uncompressed signal states. Trace signals 301 are coupled to trace array 306 via multiplexer (MUX) 305. Select signal 313 determines which of the trace signals 301, start code 304, or a combination of compression code 302 and time stamp 303 are recorded in trace array 306. Compression code 302 is recorded as either a pattern that does not likely occur in normal recording or a unique code. A compression code 302 is written to indicate that no transition occurred in any of a program selected (program inputs 323) number of trace signals 301 at a particular time of cycle clock 324. A masking function in event logic 327 may be used to select which of trace signals 301 to monitor for the compression function. Time stamp 303 stores a count (in place of trace signals 301) corresponding to the number of cycles of cycle clock 324 in which no selected trace signal 301 changed state. Start code 304 is a code written in trace array 306 (in place of trace 301 signals) indicating where recording was started in all or a portion (sub-array or Bank) of trace array 306. As such, a start code 304 will be overwritten if recording continues for an extended period because of the cyclic nature of recording in the trace array 306 or a Bank (e.g., 601–604) of trace array 306. Event logic 327 is used to generate logic combinations of system signals 310 which indicate particular events of interest, for example, event signal 318 and stop signal 328. Program inputs 323 may be used to change or select which system signals 310 are used to generate an event signal 318 for a particular trace recording. Program inputs 323 may also be used to select the Bank size signals 322 relative to trace size signals 321. If the trace array 306 is able to store N-uncompressed signal states, where $2^M$ equals N, then an M-bit counter would be sufficient to generate all addresses for accessing trace array 306. If it is desired to partition the N-position trace array into Banks of size $2^P$ (where P is equal to an integer<M), then the number of Banks that may be partitioned in trace array 306 (of size $2^M$) may be expressed as $2^{M-P}$. Trace size signals 321 and Bank size signals 322 are coupled to indexer 320 and are used to direct outputs 317 that generate addresses 315 via the address decode 316. Event signal 318 and stop signal 328 may be coupled to the address decode 316 to direct the particular stop address 330 and event addresses 319 which may be stored by output processor 308. In other embodiments of the present invention the stop address 330 is retained simply by not indexing the address counters (event counter 506 and cycle clock counter 505) after receipt of a stop signal 318 and starting readout from the stop address 330. Since the trace array addresses 317, corresponding to an event signal 318, are important in reconstructing sequences readout of trace array 306, output processor 308 may be used to store event storage addresses 319 and a stop address 330. Output processor 308 is used to reconstruct stored trace signals 301 that have been compressed according to embodiments of the present invention. It is important to note that exemplary output processor 308 in FIG. 3 is an example of a hardware implementation. Other embodiments of the present invention implement the function of the output processor 308 with software instructions or script code. With a software output processor, code would determine where and how stop address 330 and event address 319 are to be stored or tracked to reconstruct the trace signal data 301 during read out. Likewise, the signals 326 directing indexer 320 to generate appropriate trace array addresses for read out may be generated by a portion of the software code generating the function of output processor 308. The signal states (trace signals 301) and the codes (e.g., start code 304, time stamp 303, and compression code 302) stored in trace 306 array may be read with a hardware output processor 308 or software code providing the output processing function according to embodiments of the present invention. The output processing function (hardware or software) may be external to the IC containing the trace array 306 and still be within the scope of the present invention. Output 309 represents signals corresponding to the reconstructed readout of trace array 306 may be used to analyze or debug operations of system.

Figure 4:
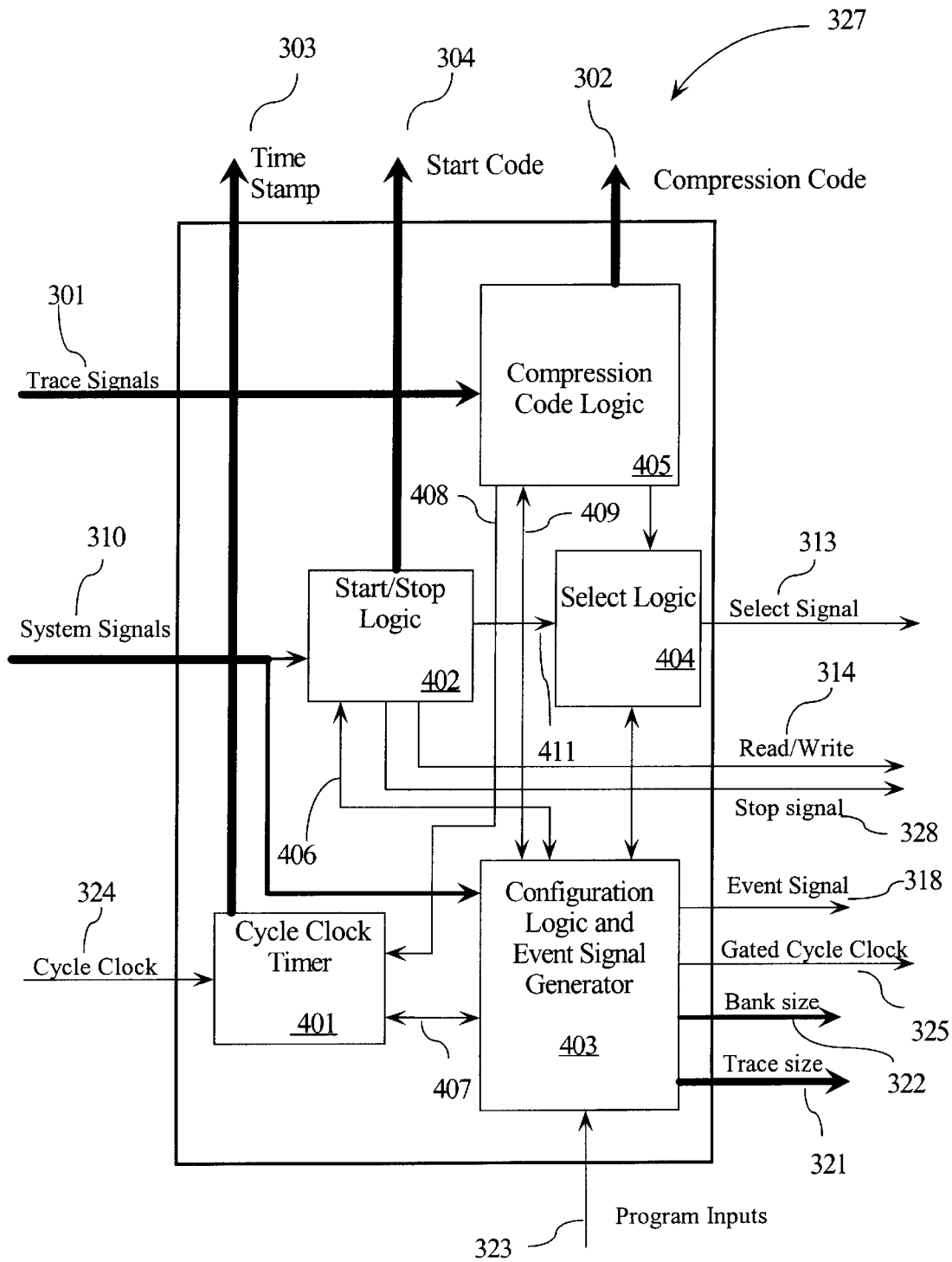
FIG. 4 is a block diagram of event logic used in an event recording system according to an embodiment of the present invention.

FIG. 4 is a block diagram of exemplary logic elements which may be included within event logic 327. FIG. 4 illustrates in more detail of how various signals may be generated. Trace signals 301 are processed by compression logic 405 to determine if at least one selected trace signal 301 (masking function) has a state change at each cycle clock 324 time. If there is no state change on any of the selected trace signals 301, then the value of time stamp 303 is incremented and cycle clock counter 505 is not incremented. Time stamp 303 accumulates a count corresponding to the number of cycles of cycle clock 324 which occur without any selected trace signal 301 changing state. Compression logic 405 and start/stop logic 402 signal select logic 404 to generate the appropriate select signal 313 to gate multiplexer (MUX) 305. If no selected trace signal 301 is changing state, then select signal 313 will direct that compression code 302 and time stamp 303 be written in place of trace signal 301 states. When at least one of selected trace signals 301 again changes state, the time stamp 303 and compression code 302 are then stored (written) in trace array 306 in place of states of trace signals 301. Configuration logic and event signal generator (CLEV) 403 has exemplary logic circuits that receive program inputs 323, system signals 310, signals 406 from start/stop logic 402, and signals 409 from compression code logic 405 and generates outputs for other logic blocks, for example event signal 318, gated cycle clock 325, Bank size signals 322 and trace size signals 321. Compression logic 405 signals (signals 408) cycle clock timer 401 when no state changes occur in selected trace signals 301 and cycle clock time 401 signals CLEV 403 via signals 407 to send gated cycle clock 325 to indexer 320. Start/stop logic 402 receives system signals 310 and signals 460 from CLEV logic 403 and generates a read/write signal 314 for trace array 306 and outputs 411 for select logic 404. Select logic 404 generates a select signal 313 that directs appropriate outputs 312 of MUX 305 to trace array 306. In this manner, a start code 304, compression code 302, time stamp 303 and trace signals 301 are selectively recorded in trace array 306. Logic included in start/stop logic 402 receives system signals 310, outputs 406, and determines when to indicate the start of (start code 304) trace signal 301 recording, when to stop recording trace signals 301 (stop signal 328), and when to write or readout (read/write 314) states of trace signals 301 in trace array 306.

Figure 5:
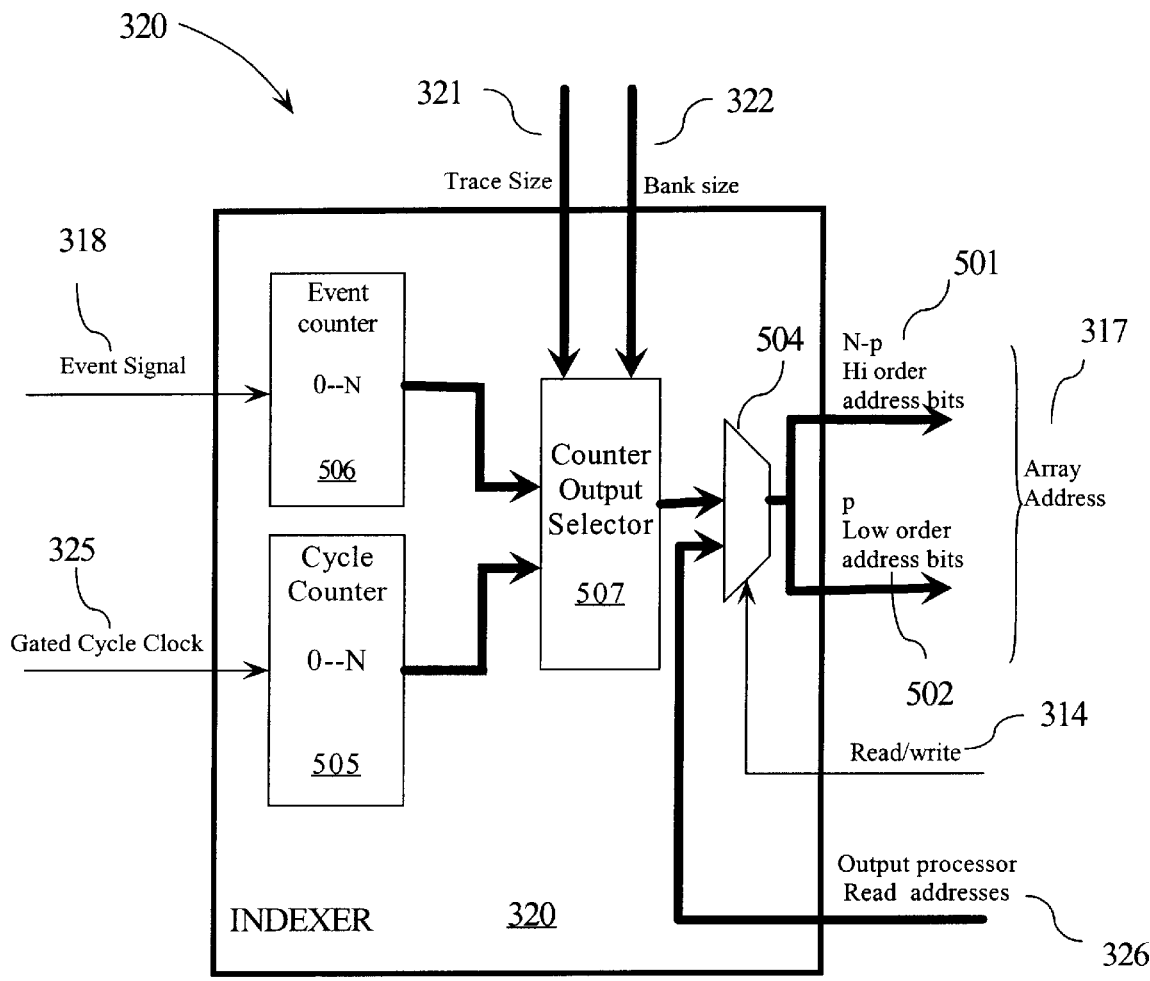
FIG. 5 is a block diagram of an indexing unit used in an event recording system according to embodiments of the present invention.

FIG. 5 is a more detailed block diagram of exemplary logic in an indexer 320. Indexer 320 generates trace array addresses 317, which may be decoded (if necessary), to access particular storage locations in trace array 306 during a read or a write operation. In one embodiment of the present invention, event signal 318 is received in a binary event counter 506 which is configured to count up (from zero to N–1) where N is the entry size of trace array 306. Since the states of selective bits of a binary counter repeat, for example the lowest order bit repeats every two counts and the two lowest order bits repeat every four counts, monitoring only selective bits has the effect of a circular counter where a "reset" to an initial count is automatic. If all N-outputs of event counter 506 were monitored, the output pattern would repeat after N-counts. Event counter 506 counts event signal 318 which represents predetermined (e.g., by program inputs 323) conditions of interest in a system having trace signals 301. Event signal 318 may be generated by a logic combination of system signals 310 in CLEV 403. Cycle clock counter 505 counts gated cycle clock 325. Gated cycle clock 325 is generated by simply gating (e.g., logic AND) cycle clock 324 with a logic signal from compression logic 405. As long as at least one selected trace signal 301 changes state at each cycle clock 324 time, gated cycle clock 325 follows cycle clock 324. Whenever compression logic 405 determines that no selected trace signal 301 changes state, then gated cycle clock 325 is turned off. While gated cycle clock 325 is off, trace array addresses 317 changes only if an event signal 318 occurs. When compression logic 405 determines that selected ones of trace signals 301 have state changes, then gated cycle clock 325 is turned on and trace array addresses 317 again increment each cycle clock 325 time. It should be noted that other counter configurations, along with any necessary address decoder 316, may be used to generate trace addresses 317 and still be within the scope of the present invention.

For the exemplary indexer 320 in FIG. 5, counter output selector 507 selects outputs of event counter 506 and cycle counter 505 to form the high order address bits 501 and the low order address bits 502 of the trace array addresses 317. Counter output selector 507 receives trace size signal 321 data and Bank size signal 322, generated from program inputs 323, and determines which outputs of event counter 506 and cycle counter 505 to use to form trace array addresses 317. Event signal 318 indexes event counter 506 and generates the high order bits of array addresses 317, thus effectively partitioning trace array 306 into sub-arrays or Banks when directed by program inputs 323. Between event signals 318, the trace array addresses 317 are repeated within the Bank determined by the count in event counter 506. In FIG. 5, both event counter 506 and cycle clock counter 505 are shown as size "N"(the size of trace array 306), therefore trace array 306 may be effectively partitioned as one trace array 306 (one Bank) with N-entries or N-Banks of one entry. While N-Banks of one entry may not be of much practical interest, it would be a possibility in the embodiment shown in FIG. 5. Trace size signal 321 and Bank size signal (number of Banks) 322 are inputted from program data 323 based on the needs of a given trace operation.

Figure 6A:
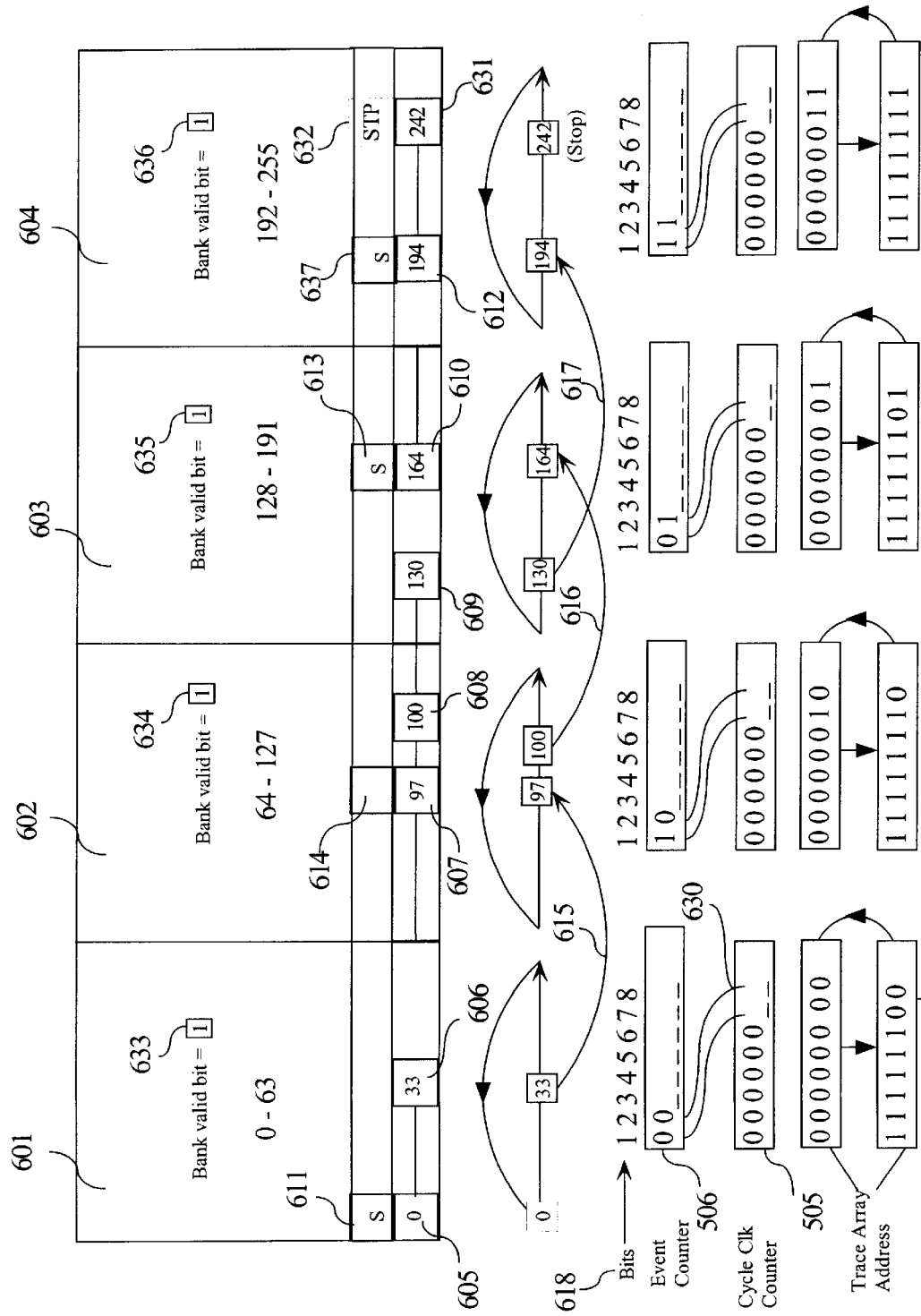
FIG. 6A illustrates partitioning of a trace array and corresponding states of event and cycle clock counters.

FIG. 6A illustrates operations of a trace recording system 300 using a trace array 306 according to embodiments of the present invention.

FIG. 6A illustrates a trace array 306 of entry size of N=256 partitioned into four Banks 601–604. To address the full trace array 306 with 256 entries, eight binary bits may be used to generate the 256 unique addresses. Bit numbers 618 (bit 1 indicates the lowest order bit) are used in this example to designate address bits for trace array 306. If event counter 506 is an 8 bit binary counter and only the two lowest order bits are used, then the two lower order bits cycle every four counts or four events. Likewise if cycle clock counter 505 is an 8 bit binary counter and only its six lowest order bits are used, then these six bits cycle every 64 counts of cycle clock 324. Counter select logic 507 is used combine the outputs of these two counters based on inputs, trace size signal 321 and Bank size signal 322, to generate trace array address 317. For the example in FIG. 6A, a Bank number 322 of four combined with a trace size of 64 would signal counter select logic 507 to combine the outputs of event counter 506 and cycle clock counter 505, as shown, to create an 8 bit trace array address 317. The two high order bits of trace array address 317 would be the two low order bits from event counter 506 and the remaining six lower order bits would be the six low order bits from cycle clock counter 505. With this combination, every time an event signal 318 occurs, a different group (0–3) of 64 entries of trace array 306 is selected. Occurrences of event signal 318 will cause the trace address 317 to cyclically index to through the four Banks 601–604. The particular entry point in a Bank will be determined by the count value in cycle clock counter 505. In the same manner, cycle clock counter 505 will count gated cycle clocks 325 cycling repeatedly from 0 to 63 while in each Bank 601–604. If read/write signal 314 is signaling a write enable, then trace signals 301 are recorded in trace array 306 at trace array addresses 317 determined by the logic combination of count values in event counter 506 and cycle clock counter 505 and old data is cyclically overwritten with new data until a read is signaled by read/write signal 314 (occurrence of a stop signal 328).

When a Bank 601–604 is selected by the low order bits of event counter 506, trace signals 301 commence recording in whatever particular address is selected by the combination of event counter 506 and cycle clock counter 505. Whenever a Bank (e.g., 601–604) is first selected, a start code (e.g., start code 611) is written in place of trace signals 301. Start/stop logic 402, along with select logic 404, generates a select signal 313 which signals MUX 305 to select a start code 304 as the input to trace array 306 in place of trace signals 301.

The operation illustrated in FIG. 6A does not require that Event counter 506 or Cycle clock counter 506 to start at a zero or reset condition as shown. A start code 611 at trace array address 605 (0) is done to simply the example in FIG. 6A. For the example in FIG. 6A, assume that circumstances have led to trace signal 301 recording in Bank 601 at address zero (605). When Bank 601 is selected and read/write 314 signals a write enable, then Bank 601 valid bit 633 would be set to a logic true (e.g., logic one) which indicates that Bank 601 has valid data. The Bank valid bits 633–636 are used during a read or playback of recorded trace signal 301 data and will be further explained later. There is one Bank valid bit (e.g., 633–636) for each possible trace partition or Bank; the total number of Bank valid bits would be determined by the size "N" of trace array 306 and the number of usable Banks possible with a trace size "N". For example, given a trace array 306 with N=256, it is possible to have 256 Banks one bit deep but a one bit entry trace array 306 may not be very useful for acquiring trace signal 301 data. The number of useful Banks would normally be less than the trace array 306 size "N".

At address 605 a particular start code 611 is written and trace signals 301 continue to be recorded until the trace array address 606 (33) is reached at which time an event signal 318 is received and causing the low order bits of event counter 506 to index (from binary 00 to binary 10). When an event signal 318 is received, the trace array location at trace array address 317, is recorded or stored as event address 319. In this case, trace array address 606 (33) is recorded as event address 319. A trace address 317, coincident with an event signal 318, may be stored as event address 319 by output processor 308. Since the low order bits of event counter 506 are directed to become the high order bits (630) for trace array address 317, then trace array address 317 immediately indexes (illustrated by arrow 615) to address 97 (64+33) in Bank 602 where a start code 614 (not shown) may be written (it is also possible for a stop signal to be received at this time and no new start would be recorded). When another event signal 318 is not received for an extended number (e.g., >64) of cycles of cycle clock 324 start code 614, originally written at address 97, will be over written by new trace signals 301. For this reason, the block representing a start code 614 is shown with no "S" since the original start code 304 data has been overwritten. At some later time, another event signal 318 is received when the cyclic trace address 317 is at address 100. At this time event counter 506 is incremented and trace address 317 is indexed to Bank 603 (arrow 616) to address 610 (address value 164=100+64). As previously stated, a start code 613 is recorded at the entry trace address 610 (164). If recording continues in Bank 603 and another event signal 318 is received when at trace array address 609 (130), then event counter 506 is incremented and trace array address 317 indexes to address 612 (address value 194=(130+64) where another start code 613 is recorded. In this example, recording continues in Bank 604 until another event signal 318 is counted or a stop signal 328 (e.g., derived from event logic 327) is generated from system signals 310. For this example, assume a stop signal 328 (stop indication STP 632) was received while at trace array address 631 (242) and recording of trace signals 301 is stopped (read mode selected). While it is not necessary to record an STP 632 indication in trace array 306, it is necessary to record (as stop address 330) the trace array address 317 being generated when a stop signal 328 occurs. The combination of the stop address 330 and stored Bank valid bits (e.g., 633–636) allows the trace signal 301 data to be recovered without requiring that counters 505 and 506 be preset in any known condition during recording of trace signal 301. This simplifies the operation and design of the trace recorder system 300.

When the exemplary trace array 306 shown in FIG. 6A is read, output processor 308 receives the output of trace array 306 and reconstructs the received sequences of trace signals 301. Read out of recorded trace signal 301 data proceeds after the receipt of a stop signal 328 (stop indication STP 632) at address 631. On the receipt of a stop signal 328, the stop address 330 is stored for use by output processor 308. Although recording in trace array 306 operates as a circular queue, trace array 306 is read out as a "flat array". This simply means that all the recorded trace array 306 data is read out and by simply reading data starting with trace array address zero and proceeding to trace address N. Output processor 308 generates read trace array addresses 326 and MUX 504 directs the addresses to trace array addresses 317. In the example of FIG. 6A, the trace array addresses go from 0 to 255. Output processor 308 then reads the recorded codes (stop, compression and time stamp), saved addresses (stop and event) and reconstructs the trace data 317.

To read out the trace data acquired in FIG. 6A, output processor 308 first reads out and stores the contents of trace array 306 as a flat array. The saved stop address 330 (242) tells the analysis program where to start the trace data 317 reconstruction. Address 631 (242) was saved and output processor 308 would index to the next Bank with a Bank valid bit equal to one. In this case, the next Bank is Bank 601. Bank 601 has valid data for this trace signal 301 acquisition. Output processor 308 next determines if Bank 601 has a start code recorded. Bank 601 has a start code 611 recorded. In this case, "good" data starts immediately following start code 611 (first in data for Bank 601) and ends at event signal address 606 (last in data for Bank 601). If a start code 304 is present in a valid Bank (e.g., 601), then recording in Bank 601 did not loop, thereby the first recorded start code 611 was overwritten. When the event signal address 606 is encountered, output processor 308 indexes to the next sequential Bank 602 and checks the value of Bank valid bit 634. Since trace signal 301 data was recorded in Bank 602, its Bank valid bit 634 is equal to one. Next output processor 308 searches for a start code 304 within the data bounded by address values 64 and 127 (the extent of Bank 602). Since the original start code 614 written at address 97 was over written, no start code exists in Bank 602. Output processor 308 next searches and finds an event address 608. Since a start code does not exist and Bank valid bit 634 is a one, then all the data in Bank 602 are valid and output processor 308 assembles the next trace data output 309 by starting at the address after event address 608 (100) and proceeding back around (address 101 to address 127 and then to address to 100). This puts the stored trace signal 301 data in the correct order (first-in, first-out) for trace output 309. When event address 608 (100) is encountered, output processor 308 indexes to the next Bank with a Bank valid bit equal to one, in this case Bank 603. Again output processor 308 searches in Bank 603 for a start code 304 and finds start code 613 at Bank address 610 (164). Next output processor 308 searches and finds event address 609 (130) and determines that valid trace data is stored from trace address 610 (164) to trace address 609 (130) (between addresses 128 and 130 and between addresses 164 and 191). Output processor 308 assembles trace output data 309 starting at trace address 610 (164) and proceeding to trace address 191 (not indicated) and then from trace address 128 (not shown to trace address 609 (130). When event address 319 (corresponding to trace address 130) is encountered, output processor 308 again indexes to the next Bank with a Bank valid bit equal to one, which is Bank 604. Output processor 308 searches Bank 604 and finds a start code 637 at address 612 (194) and a stop address 631 (242). STP 632 is shown only as an indication of a stop address 631 and is not written in trace array 306 in actual practice. Stop address 631 (242) is simply saved by output processor 308 by reading the trace address 317 after a stop signal 328 determined by event logic 327. Output processor 308 begins assembling the trace output 309 starting at start code 637 (address 194) and proceeding to stop address 631 (242). Trace signal 301 data in locations at trace addresses 243–255 and 192–193 are discarded. Valid Banks (e.g., 601–604) have their Bank valid bits (e.g., 633–636) reset to zero when they are read out to prepare for another following trace operation. The embodiments of the present invention in FIG. 6A use only the start codes 304, event addresses 319, Bank valid bits and the saved stop address 330 to facilitate reconstruction of the data sequences of stored trace signals 301.

Valid trace signals 301 recording for a particular trace operation into exemplary trace array 306 is indicated by the receipt of a system signal 310 in event logic 327 which generates a start code 304 which is written into trace array 306. Trace recoding would remain in a particular Bank (e.g., 601) until system signals 310 generated, in event logic 320, an event signal 318 which event logic 327 was programmed to recognize as an event signal which required an increment of the trace address 317 equal to the Bank size signal 322.

Figure 6B:
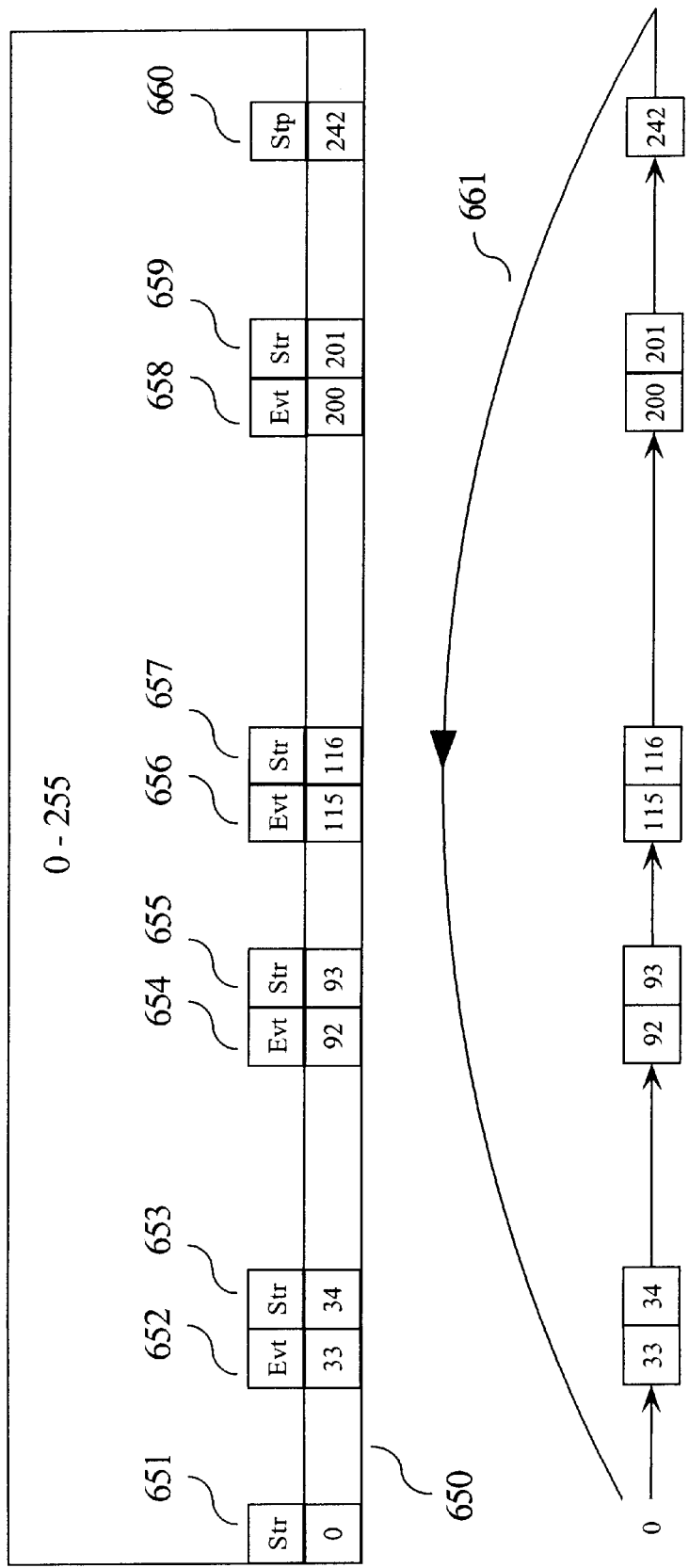
FIG. 6B illustrates an embodiment of the present invention where multiple event addresses and multiple start codes may be recorded in a trace array or Banks within the trace array.

FIG. 6B illustrates another embodiment of the present invention. In FIG. 6A, whenever an event signal 318 is received the Event counter 506 was incremented an index amount indicated by the Bank size signal 322. In this manner, an event signal 318 causes trace recording to switch to a next Bank. In the embodiment of FIG. 6B, an event signal 318 may be optionally programmed to increment the trace address 317 by an amount indicated by the Bank size signal 322 or by one. In FIG. 6A, the Banks (e.g., 601–604)

would have only one start code 304 and either an event address 319 recorded or a stop address 330 recorded. In the embodiment of FIG. 6B, multiple start codes 304 and multiple Event addresses 319 may be recorded. While the example in FIG. 6B shows the trace array 306 partitioned into only one Bank 650, the embodiment of FIG. 6B works the same when multiple Banks are used (e.g., the embodiment of FIG. 6A). In another embodiment of the present invention, event signals 318 are identified as either signals that cause a trace array address 317 to index by one or by an amount indicated by the Bank size signal 322. In the trace array 306 in FIG. 6B, only one type of event signal 318 is programmed. At time zero (corresponding to trace array address 651), a Start code 651 is recorded. When the trace array 306 address has been incremented to trace address 652 (33), an event signal 318 (at trace address 652) is received and event address 319 (33) is recorded. The indexer 320 increments the trace array address 317 and a start code 304 is recorded at trace array address 653 (34). Trace signal 301 recording continues from start code 653 (at trace array address 34) to event signal 654 (trace array address 92), start code 655 (trace array address 93) to event signal 656 (trace array address 115), start code 657 (trace array address 116) to event signal 658 (trace array address 200), and start code 659 (trace array address 201) to stop signal 660 (trace array address 242). In the embodiment of FIG. 6B, read output processor 308 is able to recover the received order of the recorded trace signals 301 by reading from the stop address 242 forward until the first start code 651 (trace array address 0) is encountered and then assembling the data from start code 651 to the event address 652 (33). Succeeding data is assembled from the next sequential start codes 653, 655, 657, 659 until stop address 660 (242) is encountered. Event addresses 652, 654, 656, and 658 indicate where the event signals 318 of interest occurred. If no stop signal 328 was received, then recording of trace signals 301 would loop back (661) to trace address 651 (zero) and start codes and trace signal 301 data would be overwritten until a stop signal 328 was received.

If trace array 306 was partitioned into multiple Banks like the example in FIG. 6A, then the embodiment of FIG. 6B may program (e.g., program inputs 323) the following possible types of start and event signal conditions. The following assumes that the event and start conditions are determined from combinations of system signals 310. Other signals may be used to generate the following conditions and still be within the scope of the present invention.

1) System signals 310 generate a signal combination that event logic 320 is programmed to recognize as a start code 304 which is recorded to mark the start of trace of trace signals 301.

2) System signals 310 generate a signal combination that event logic 320 is programmed to recognize as an event signal 318 which signals indexer 320 to record the Event address 319 and to increment the trace array address 317 by one. In this case, trace recording remains in a particular Bank (regardless of the value of Bank size signal 322).

3) System signals 310 generate a signal combination that event logic 320 is programmed to recognize as an event signal 318 which signals indexer 320 to record the event address 319 and to increment the trace array address 317 by an amount equal to the value of Bank size signal 322. In this case, trace recording jumps to the next Bank (e.g., 602) and a Bank valid bit (e.g., 634) is recorded.

4) System signals 310 generate a signal combination that event logic 320 is programmed to recognize as a stop signal 328 which signals indexer 320 to record stop address 330 and enable a read out of trace array 306.

Figure 7:
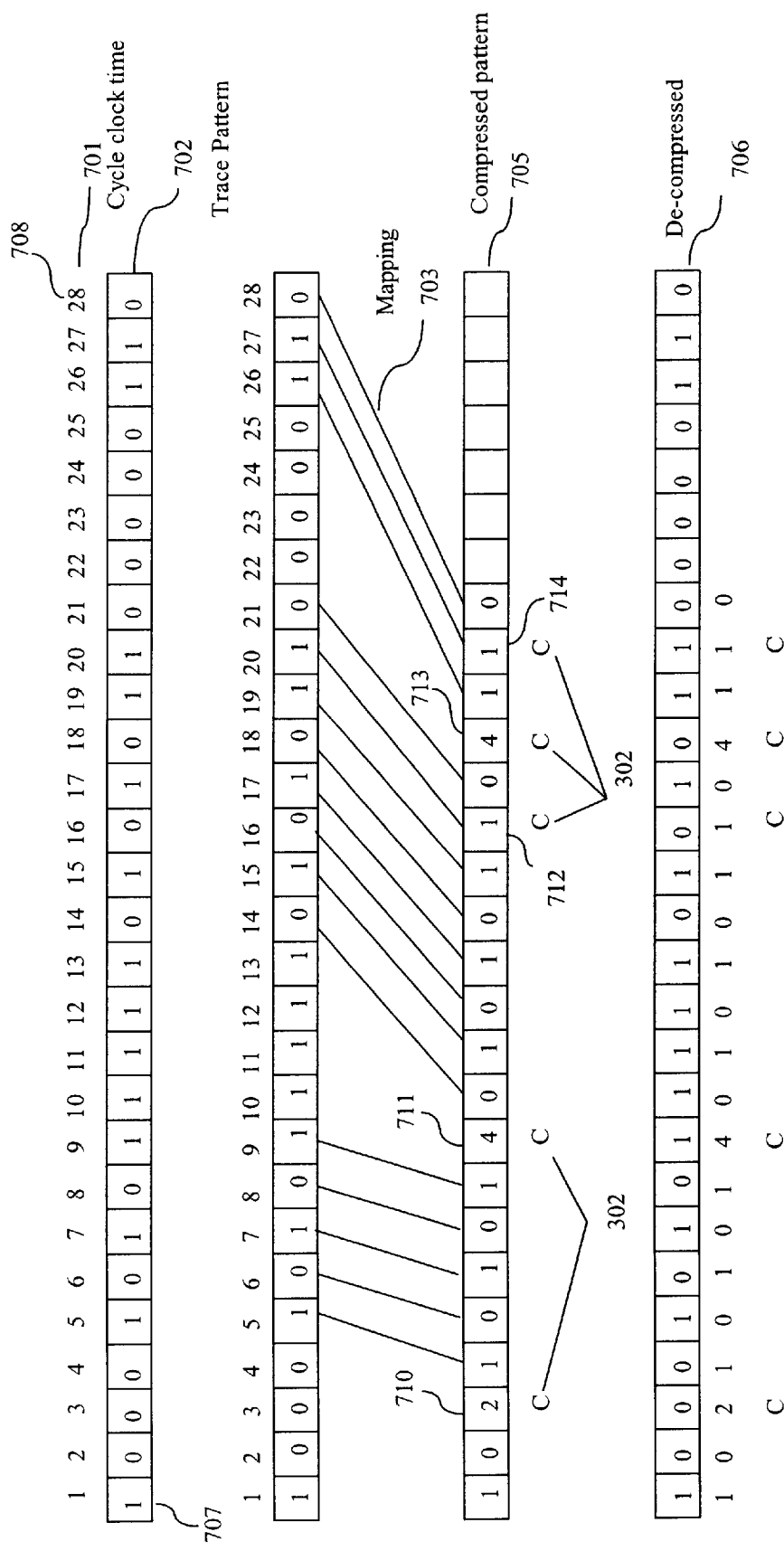
FIG. 7 illustrates using embodiments of the present invention to compress and decompress trace array data.

The example illustrated in FIG. 6A assumed that all trace signals 301 had at least one transition at each cycle clock 324. FIG. 7 illustrates another embodiment of the present invention where a compression method is used to effectively increase the size of a trace array 306. This embodiment of the present invention uses time stamp 303 and compression code 302 when recording trace signals 301 in trace array 306. To simplify the explanation of compression of recorded trace signals 301, a single trace signal 702, out of a possible k traces for a trace array 306, is shown with corresponding cycle time marks 701 (cycle time 707 (1) through cycle time 708 (28)). Without compression the exemplary single trace signal 702 would appear in trace array 306 as shown. Mapping 703 is used to show how the compression method operates according to embodiments of the present invention.

Assume that recording of trace signal pattern 702 starts at cycle clock time 707 and proceeds as shown through clock time 708. At cycle time "3" a repetitive zero (not state change) is received from the trace signal 702 (in reality all selected trace signals 310 must have no state changes). Since this is a repeated zero, compression logic 405 causes a compression code "C" 302 to be recorded at cycle time "3" and gated cycle clock 325 is stopped so that cycle clock counter 505 does not increment; recording remains at the trace array address 317 corresponding to cycle time "3" until at least one selected trace signal 301 changes state. While recording remains at the trace array address 317 corresponding to cycle time "3", cycle clock timer 401 counts the number of gated cycle clocks 325 in which there are no changes in any of selected trace signals 301 (e.g., trace signal 702 does not change state). In the example in FIG. 7, the time stamp 710 at cycle time "3" records a value of "2" (corresponding to two repetitions of the zero received after cycle time "2"). Since the trace signal 702 changes state at cycle time "5", alternating states commence recording in trace array 306 until cycle time "10" where the trace signal state (logic one) is repeated from cycle time "9". Again the compression logic 405 determines that no state change occurred in trace signal 702. At cycle time "10", gate cycle clock 325 is again stopped and time stamp 303 accumulates four sequential ones before trace signal 702 again changes state, therefore a compression code "C" 302 is again recorded at the "compressed" array address corresponding to cycle time "10" along with time stamp 711 which has a value of four. At cycle time "14", trace signal 701 again changes state and alternating state recording continues until cycle time "20" where a repeating one is encountered. Again a compression code "C" 302 is recorded and gated cycle clock 325 is stopped. At cycle time "20" only a single repeated one is recorded from trace signal 701 and a time stamp 712 value of one is recorded. At cycle time "22" a repeating zero is encountered and a compression code "C" 302 is recorded and then a time stamp 713 value "4" is recorded corresponding to the following four sequential repeated zeros. A repeating one is received from trace signal 701 at cycle time "27" and compression code "C" 302 is recorded and a time stamp 714 value of one is recorded corresponding to a single repeated one. Finally a zero is recorded at cycle time "28". In this example, 28 states of trace signal pattern 702 have been compressed into 21 states to generate compressed signal pattern 705 for exemplary trace signal 702. It should be emphasized that in an actual trace array 306, all the selected trace signals 301 would have remained unchanged for the number of cycles recorded by time stamp 303. In FIG. 7, only one trace signal 702 of trace signals 301 is shown to simplify the explanation of the compression method. To recover stored trace signal 301 data recorded with compression, the output processor 308 assembles the data as indicated above and then searches the data for compression codes 302 and corresponding time stamps 303. The states of each of the trace signals 301 prior to a compression code are then repeated the number of times indicated by the time stamp 303 (e.g., 710–714) for each occurrence of a compression code 302 in trace read out data 309. In one embodiment of the present invention, the compression code 302 is written in place of trace signal 301 data where the size of the trace array is k×N. Since actual stored trace signal 301 data could correspond to the compression code 302 (the compression code 302 would be one of the possible combinations of k bits), there is one chance in $2^k$ for a compression code 302 to be incorrectly identified. In another embodiment of the present invention, trace array 306 is expanded to a size (k+1)×N where the extra bit is reserved as the compression code 302. In the embodiment with an expanded trace array 306, there is no chance for stored trace signal 301 states to be mistaken as a compression code 302. Compression of trace signal 301 data, according to embodiments of the present invention is a lossless process. Lossless compression means that the worst case condition using compression uses no more storage locations than without compression. The efficiency using compression, therefore, is better than or equal to non-compression. The worst case condition is where trace signal 301 data changes states every other cycle clock.

The circular nature of trace array 306 and Banks within trace array 306 (e.g., Banks 601–604) may result in old data being overwritten with new data. When compression is being used, according to embodiments of the present invention, care has to be taken during readout and reconstruction of recorded trace signals 301. A problem occurs when trace signal 301 recording writes over the trace data preceding a compression code 302. Since the location in trace array 306, at a compression code 302, has the time stamp 303 value recorded, output processor 308 would not be able to determine which logic bit (logic one or zero) to repeat. This problem only happens if an event signal 318 occurs while writing over trace signal 301 data immediately preceding a previously recorded compression code 302 leaving only the compression code 302 and not the corresponding trace signal 301 data to which it is related. Each trace recording in trace array 306 begins with a start code 304. The only reason for a missing start code 304 in a valid portion of trace array 306 (Bank valid bit equal one) is for the start code 304 to have been overwritten by stored trace signals 301. If the start code 304 is not overwritten, then any written compression code 302 will reside between the start code 304 and an event address 319. However, if trace recording loops within the trace array 306 or a partitioned Bank (e.g., 601–604) then it is possible that an event signal 318 may occur coincident with trace signal 301 data immediately preceding a compression code 302. When reading out data where the trace signal 301 data immediately preceding a compression code 302 has been overwritten, output processor 308 will search the portion of the trace array 306 and find no start code 304 (it has been overwritten) but will find an event address 319 or a stop address 330 (last address in array address 317 following a stop signal 328). In either case, the "first-in" trace signal 301 data for the portion of trace array 306 will begin immediately following the event address 319. In this case, output processor 308 will find a compression code 302 written in the address immediately following the event address 319 or stop address 330 and discard the compression code 302.

Figure 8A:
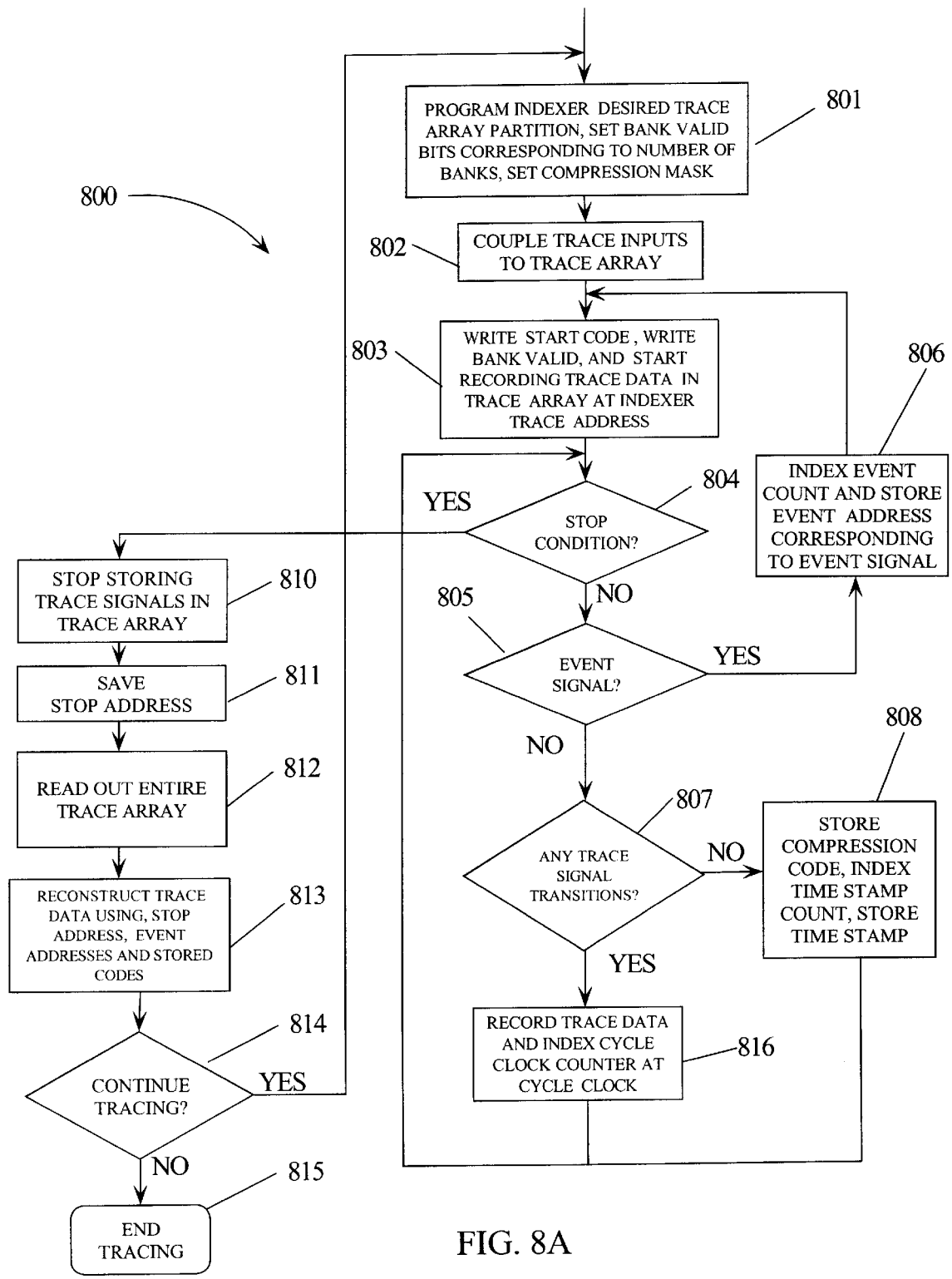
FIG. 8A is a flow diagram of steps in recording trace signals according to embodiments of the present invention.

FIG. 8A is a flow diagram of method steps 800 for recording trace signal 301 data in a trace array 306. In step 801, indexer 320 is programmed for the desired partition of trace array 306 into M-Banks or sub-arrays (e.g., 601–604). M-Bank valid bits are also allocated corresponding to the number of Banks and the compression mask is set corresponding to the selected trace signals 301 monitored for compression. In step 802, the trace signals 301 are coupled to trace array 306. In step 803, a start code 302 is written into the trace 306 location corresponding to the trace array address 317, trace signal 301 states are recorded, and trace array addresses 317 are incremented by gate cycle clock 325. A test is done in step 804 to determine if a stop signal 328 has occurred. If the result of the test in step 804 is YES, then in step 810 trace recording is stopped and gated cycle clock 325 is turned off. In step 811, the trace array address 317 corresponding to the occurrence of the stop signal 328 is saved. In step 812, the entire trace array is read out by output processor 308 and saved as a "flat" array. In step 813, output processor 308 reconstructs recorded sequences of trace signal 301 in the "first-in", "first-out" (FIFO) order in which they were received using the stop address 330 and event addresses 319, and stored codes (e.g., start code 304, compression code 302 and time stamp 303). First-in first-out means the readout of states of the first signals are placed back in the same order in which they were received and stored. A test is done in step 814 to determine if tracing is to continue. If the result of the test in step 814 is NO, then in step 815 tracing is ended. If the result of the test in step 814 is YES, then a branch is taken back to step 801 to allow a new trace to be programmed with program inputs 323. If the result of the test in step 804 is NO, then a test is done in step 805 to determine if an Event signal 318 has occurred. If the result of the test in step 805 is YES, then in step 806 event counter 506 is incremented one and the event address 319 corresponding to the event signal 318 is saved. Incrementing the event counter 506 causes a new Bank to be selected (if the trace array 306 is partitioned) and step 803 is again executed. If the result of the test in step 805 is NO, then a test is done in step 807 to determine if at least one selected trace signal 301 had a state change at cycle clock 324 time. If the result of the test in step 807 is NO, then compression code 302 is stored at the trace array address 317 corresponding to no state changes in selected trace signals 301, the time stamp 303 is incremented one count, and the time stamp 303 is recorded. Following step 808, step 804 is again executed for the next cycle clock 325 time. Time stamp 303 is incremented at each cycle of gated cycle clock 325 whenever no state changes occur in selected trace signals 301. When the result of the test in step 807 is again YES, then in step 816 trace signal 301 data is again recorded (state changes have occurred) and cycle clock counter 505 is incremented at gated cycle clock 325 time. After step 816, a branch back to step 804 is taken and trace signal 301 data recording continues until a stop signal 328 occurs.

Figure 8B:
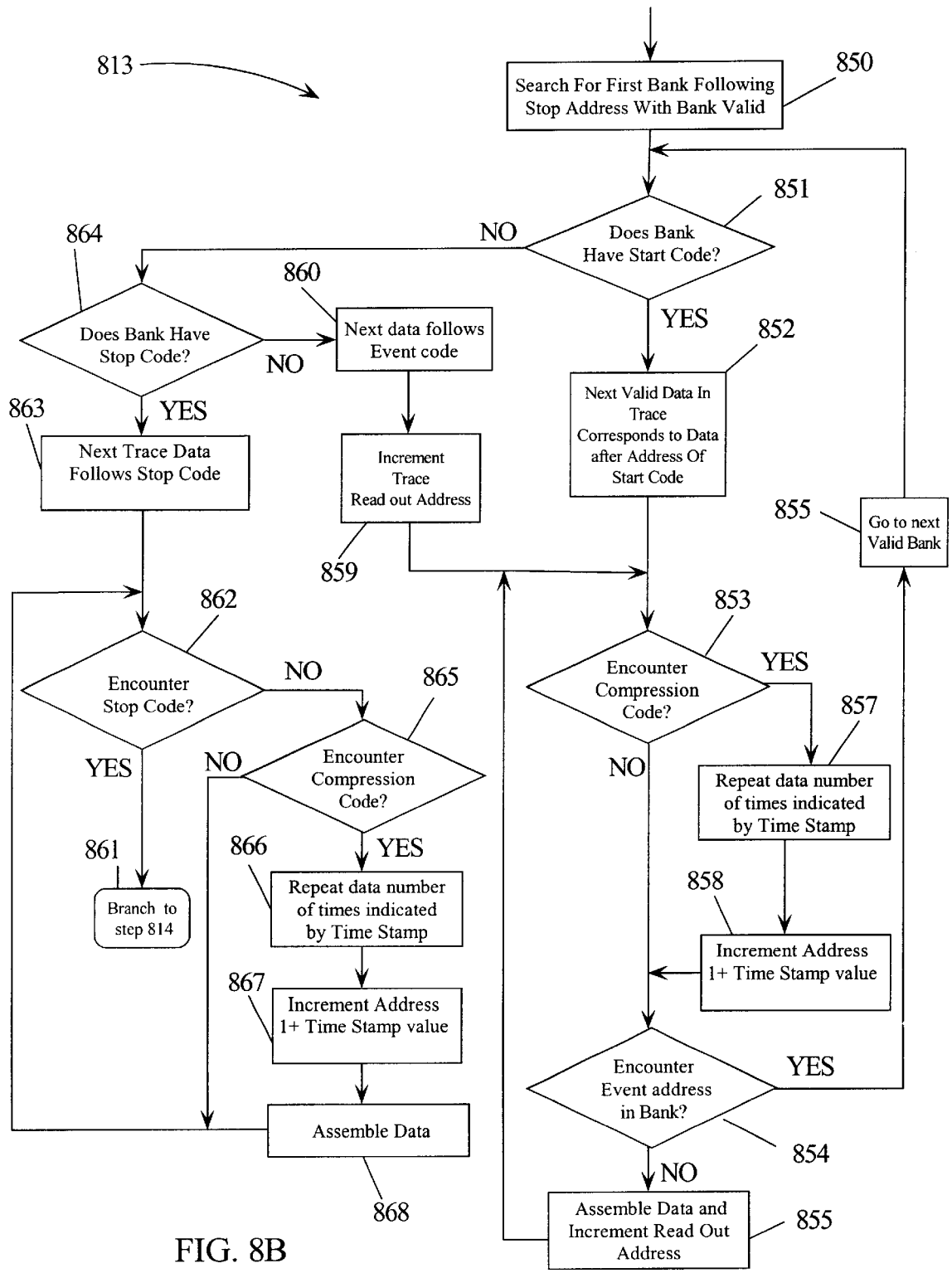
FIG. 8B is a flow diagram of steps in reading out a trace array according to embodiments of the present invention.

FIG. 8B is a flow diagram of sub-steps in within step 813 in FIG. 8A. When output processor 308 is reconstructing trace signal 301 sequences from trace data recorded in trace array 306, the entire trace array 306 is read out and stored. In step 850, output processor 308 searches the trace array 306 read out data for the first Bank valid bit (e.g., 633–636) following the stop address 330 corresponding to an occurrence of a stop signal 328. In step 851, a test is done to determine if the Bank (e.g., 601–604) has a recorded start code 304. If the result of the test in step 851 is NO, then in step 864 a test is done to determine if the Bank has the stop address 330 as one of its trace array addresses 317. If the result of the test in step 864 is YES, then in step 863 the next sequential trace data output 309 is assembled from states stored immediately follows the stop address 330. In step 862, a test is done to determine if a read out trace address corresponds to the stop address 330. If the result of the test instep 862 is NO, then a test is done in step 865 to determine if a compression code 302 has been encountered. If the result of the test in step 865 is NO, then a branch is taken to step 862 where the test for the stop address 330 is again done. If the result of the test in step 865 is YES, then in step 866 the data is repeated a number of times indicated by the time stamp 303. Instep 867, the read out trace address 326 is incremented by the value in time stamp 303 plus one. In step 868, the trace read out data 309 is assembled. Steps 862 through 868 are repeated until the Bank readout is complete 862 (from trace array address 317 immediately following the stop address 330 and back to and including the stop address 330) when a stop address in encountered in step 862. If the result of the test in step 862 is YES, the readout of the trace array 306 is complete and all the valid data have been assembled in trace output 309. A branch to step 814 (refer to FIG. 8A) is then taken in step 865. If the result of the test in step 864 is NO, then a branch to step 860 is taken where the next data for trace output 309 is the data stored immediately following the event address 319 in the Bank. Each valid Bank must have either a start code 304, a stop address 330 (corresponding to a stop signal 328), or multiple event addresses (corresponding to event signals 318). In step 859, the readout trace address 317 is incremented. In step 853, a test is done to determine if a compression code 302 has been encountered. If the result of the test in step 853 is YES, then in step 857 the trace readout data is repeated the number of times indicated by the time stamp 303 corresponding to the encountered compression code 302. In step 858, the readout trace array address 326 is incremented by the time stamp 303 value plus one. In step 854 a test is done to determine if an event address 319 is encountered in the Bank. If the result of the test in step 854 is YES, then readout of the Bank is complete and in step 855 the next Bank with valid data (Bank valid bit is true) is accessed. Step 851 is again executed for the new Bank. If the result of the test in step 853 is NO, the test in step 854 is repeated. If the result of the test in step 854 is NO, then the data is assembled as trace array output 309 and the readout trace array address 326 is incremented. A branch to step 853 is again taken to test for a compression code 302. The sub-steps within step 813 continue until the result of the test in step 862 is YES, then a branch to step 814 (refer to FIG. 8A) is taken.

Figure 9:
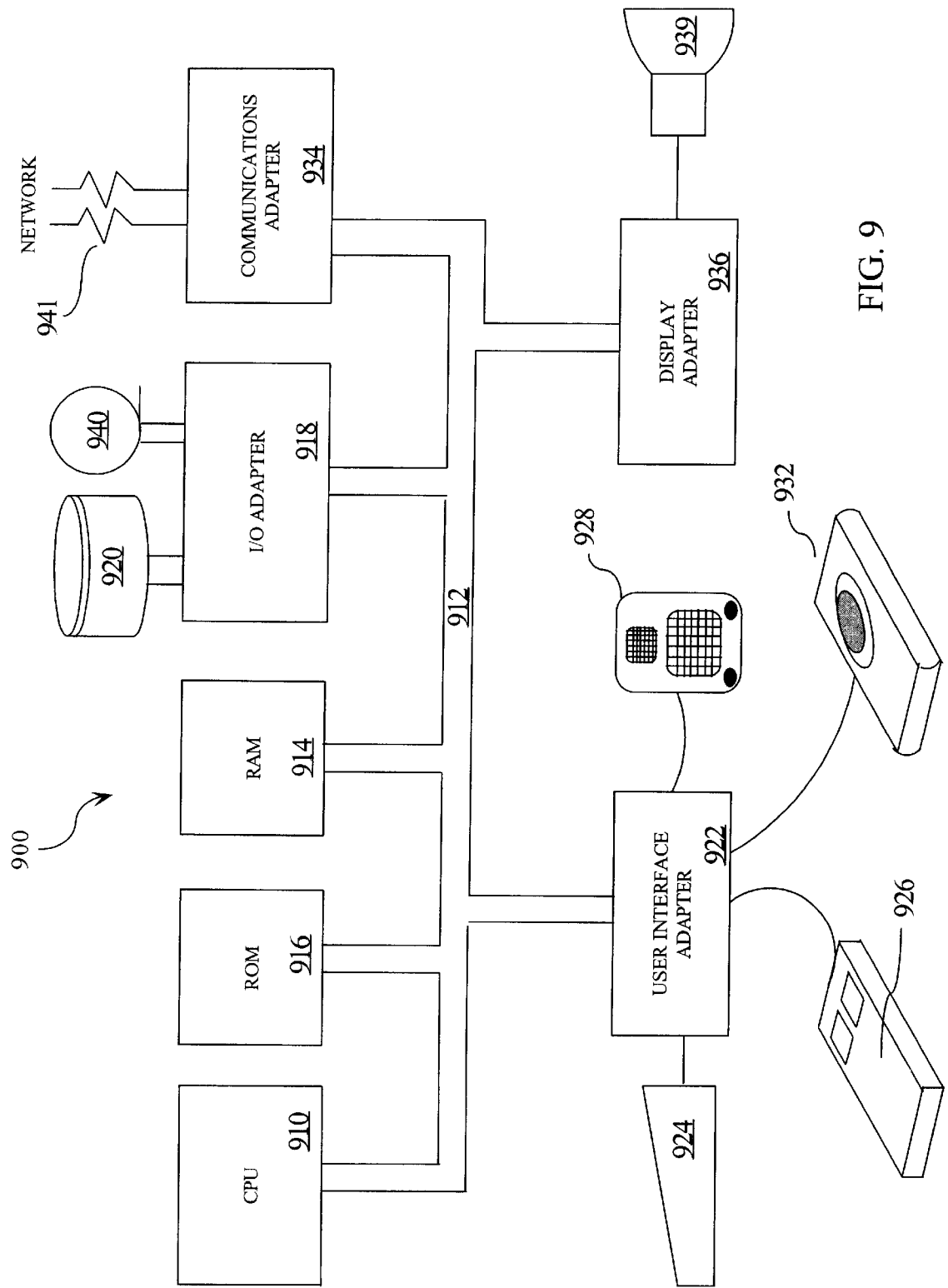
FIG. 9 is a block diagram of a data processing system which may have a VLSI processor chip which uses trace arrays according to embodiments of the present invention.

FIG. 9 is a high level functional block diagram of a representative data processing system 900 suitable for practicing the principles of the present invention. Data processing system 900, includes a central processing system (CPU) 910 operating in conjunction with a system bus 912. CPU 910 may employ a VLSI processor chip which uses debug methods and circuits according to embodiments of the present invention. System bus 912 operates in accordance with a standard bus protocol, such that as the ISA protocol, compatible with CPU 910. CPU 910 operates in conjunction with read-only memory (ROM) 916 and random access memory (RAM) 914. Among other things, ROM 916 supports the Basic Input Output System (BIOS). RAM 914 includes, DRAM (Dynamic Random Access Memory) system memory and SRAM (Static Random Access Memory) external cache. I/O Adapter 918 allows for an interconnection between the devices on system bus 912 and external peripherals, such as mass storage devices (e.g., a hard drive, floppy drive or CD/ROM drive), or a printer 940. A peripheral device 920 is, for example, coupled to a peripheral control interface (PCI) bus, and I/O adapter 918 therefore may be a PCI bus bridge. User interface adapter 922 couples various user input devices, such as a keyboard 929, mouse 926, touch pad 932 or speaker 928 to the processing devices on bus 912. Display adapter 936 supports a touch screen display 938 for acquiring touch data according to embodiments of the present invention. Display 939 which may be, for example, a cathode ray tube (CRT), liquid crystal display (LCD) or similar conventional display units. Display adapter 936 may include among other things a conventional display controller and frame buffer memory. Data processing system 900 may be selectively coupled to a computer or telecommunications network 991 through communications adapter 939. Communications adapter 939 may include, for example, a modem for connection to a telecom network and/or hardware and software for connecting to a computer network such as a local area network (LAN) or a wide area network (WAN). CPU 910 may comprise a VLSI chip that has a trace array 306 and associated circuits according to embodiments of the present invention. Logic signals of circuits being debugged are directed to a bus coupled to the input of trace array 306 and states of the trace signals 301 may be stored and recovered according to embodiments of the present invention.

What is claimed is:

1. A method for analyzing system operations comprising the steps of:

1) generating N-trace storage addresses by incrementing a cycle clock counter in response to a gated cycle clock, wherein said gated cycle clock is gated on by a start signal;

2) storing states of trace signals at said N-storage locations in a writeable trace array as selected by said N-trace storage addresses in response to a write enable of said trace array;

3) storing a start code in said trace array in response to occurrences of a first event signal, said start code stored in one of said N-storage locations in place of states of said trace signals;

repeating steps 1) through 3) until stopped in response to a second event signal;

reading states of said trace signals stored in said trace array from a trace storage address generated coincident with said second event signal until N-trace storage addresses are read;

recovering stored states of said trace signals in a first-in first-out received order by saving and discarding said stored states of said trace signals in response to said stored start codes;

saving all stored signal states in said trace array as states of said recovered trace signals if no start code is read in said trace array after reading out N of said trace array addresses;

discarding all stored signal states in said trace array from said stop trace address until a first stored start code is read; and saving, as states of said recovered trace signals, all stored signal states in said trace array in storage locations between trace storage addresses corresponding to any following stored start codes until N of said trace storage addresses are read.

2. The method of claim 1, further comprising the step of:

analyzing said recovered states of said trace signals to debug or analyze said system.

3. The method of claim 1, wherein said first and second event signals are generated in response to a logic combination of circuit states occurring within said system.

4. The method of claim 1, wherein cycles of said gated cycle clock correspond to operation cycles of said system.

5. A method for analyzing system operations comprising:
   1) combining first outputs from an event counter and second outputs from a cycle clock counter to form an M-bit address;
   2) generating N-trace storage addresses by a decode of said M-bit address;
   3) incrementing said cycle clock counter in response to a gated cycle clock, wherein said gated cycle clock is gated on by a run latch set to a first state;
   4) incrementing said event counter in response to a first event signal;
   5) storing states of trace signals at said N-storage locations in a writeable trace array as selected by said N-trace storage addresses in response to a write enable of said trace array;
   6) storing a start code in said trace array in response to occurrences of a first event signal, said start code stored in one of said N-storage locations in place of states of said trace signals;
   7) storing a trace event address in response to each occurrence of said first event signal, said trace event address corresponding to said trace storage address generated before said event counter is incremented; and
   8) repeating steps 1) through 7) until stopped in response to a second event signal.

6. The method of claim 5, wherein said combining step 1) combines P low order bits of said event counter to form P high order bits of said M-bit address and selected (M minus P) low order bits of said cycle clock counter to form remaining (M minus P) bits of said M-bit address.

7. The method of claim 6, wherein trace array is partitioned into $2^P$-Banks wherein P is an integer less than M.

8. The method of claim 7, wherein a valid Bank of said $2^P$-Banks has a corresponding Bank valid bit set to a logic one when said start code is written into any location within said valid Bank and said Bank valid bit of said valid Bank is set to a logic zero when stored states of said trace array within said valid Bank are read.

9. The method of claim 8, further comprising the step of:
   reading said trace array from a selected trace storage address generated coincident with said second event signal until N-trace storage addresses are read; and
   recovering stored states of said trace signals in a first-in first-out received order by saving and discarding said stored states of said trace signals in response to sequences of said start codes, said trace event addresses, and said Bank valid bits.

10. The method of claim 9, wherein said recovering step further comprises the steps of:
   1) saving all stored states in said trace array as recovered states of said trace signals if no start code is read in said trace array for N-trace storage addresses and all Bank valid bits are set to a logic one;
   2) searching for a first Bank of said $2^P$-Banks following said valid Bank containing said stop trace address which contains a Bank valid bit equal to a logic one;
   3) saving all states of said trace signals stored from a trace storage address corresponding to a start code stored in said first Bank to and including a first event storage address and discarding all other stored states of said trace signals;
   4) saving all stored signal states in said first Bank as states of said recovered trace signals beginning with said first event storage address if said first Bank does not contain said start code;
   5) repeating steps 2) through 4) until a stop Bank containing said stop event address is accessed, then going to step 6);
   6) saving all stored signal states in said stop Bank containing said stop event storage address starting from said stop event storage address if said stop Bank does not contain said start code; and
   7) saving all stored signal states in said stop Bank from a trace storage address corresponding to said start code to said stop event storage address, if said stop Bank does contain said start code, discarding all remaining states of said trace signals in said stop Bank.

11. The method of claim 10, further comprising the step of:
   analyzing said recovered states of said trace signals to debug or analyze said system.

12. The method of claim 5, wherein said first and second event signals are generated in response to a logic combination of circuit states occurring within said system.

13. The method of claim 5, wherein cycles of said gated cycle clock correspond to operation cycles of said system.

14. The method of claim 5, wherein said start code is recorded at a trace storage location corresponding to a trace storage address generated as the result of incrementing said event counter by an occurrence of said first event signal.

15. A method for analyzing system operations comprising:
   1) generating N-trace storage addresses by incrementing a cycle clock counter in response to a gated cycle clock, wherein said gated cycle clock is gated on by a start signal;
   2) storing states of trace signals at said N-storage locations in a writeable trace array as selected by said N-trace storage addresses in response to a write enable of said trace array;
   3) storing a start code in said trace array in response to occurrences of a first event signal, said start code stored in one of said N-storage locations in place of states of said trace signals;
   4) analyzing a sequence of received states of said trace signals for a first sequence;
   5) storing a compression code in said trace array in response to said first sequence;
   6) storing a time stamp code in said trace array in response to a repeated number of said first sequence;
   7) stopping said gated cycle clock in response to said first sequence;
   8) starting said gated cycle clock in response to a second sequence of said received states of said trace signals;
   9) repeating steps 1) through 8) until stopped in response to a second event signal, wherein states of said trace signals are stored compressed.

16. The method of claim 15, further comprising the steps of:
   reading said trace array from a stop trace address generated coincident with said second event signal until N-trace storage addresses are read;
   decompressing sequences of stored states of said trace signals by repeating stored states of said trace signals in response to said second and time stamp codes; and recovering stored states of said decompressed trace signals in a first-in first-out received order by saving discarding said stored states of said trace signals in response to sequences of said start code.

17. The method of claim 16, wherein said decompressing step further comprises the step of:

repeating, for a number of times, a state of said trace signal stored at an address immediately before an occurrence of said compression code, said number of times corresponding to a value of said time stamp code stored concurrent with said compression code.

18. The method of claim 16, further comprising the step of:

analyzing said recovered stored states of said trace signals to debug or analyze said system.

19. The method of claim 15, wherein said first and second event signals are generated in response to logic combinations of circuit states occurring within said system.

20. The method of claim 15, wherein cycles of said gated cycle clock correspond to operation cycles of said system.

21. An apparatus for analyzing system operations comprising:

a writeable trace array, said trace array having N-storage locations, each of said N-storage locations selected by corresponding N-trace storage addresses;

a coupling circuit to couple trace signals to said writeable trace array;

an M-bit cycle clock counter;

a decode circuit for decoding an M-bit address to generate said N-trace storage addresses;

an index circuit for generating selected of said N-trace storage addresses by incrementing said cycle clock counter in response to a gated cycle clock, wherein said gated cycle clock is gated on by a start signal;

a storage circuit for storing states of said trace signals in said N-storage locations of said trace array in response to a write enable of said trace array;

a start code circuit for storing a start code in one of said N-storage locations of said trace array in place of states of said trace signals in response to a first event signal;

a stop circuit for stopping said storing of states of said trace signals in response to a second event signal;

a read circuit for reading N-locations of stored states of said trace signals from said trace array from a stop trace address corresponding to an occurrence of said second event signal;

a recovery circuit for assembling stored states of said trace signals in a first-in first-out received order by saving and discarding said stored states of said trace array in response to said stored start codes;

a first save circuit for saving all stored signal states in said trace array as states of said recovered trace signals if no start code is read in said trace array after reading out N of said trace array addresses;

a discarding circuit for discarding all stored signal states in said trace array from said stop trace address until a first stored start code is read; and a second save circuit for saving, as states of said recovered trace signals, all stored signal states in said trace array in storage locations between trace storage addresses corresponding to any following stored start codes until N of said trace storage addresses are read.

22. The apparatus of claim 21, wherein said first and second event signals are generated in response to a logic combination of circuit states occurring within said system.

23. The method of claim 21, wherein cycles of said gated cycle clock correspond to operation cycles of said system.

24. An apparatus for analyzing system operations comprising:

a writeable trace array, said trace array having N-storage locations, each of said N-storage locations selected by corresponding N-trace storage addresses;

a coupling circuit for coupling trace signals to said writeable trace array;

an event counter;

a cycle clock counter;

a combining circuit for combining first outputs from said event counter and second outputs from said cycle clock counter to form an M-bit address;

a decode circuit for generating said N-trace storage addresses from a decode of said M-bit address;

a first index circuit for incrementing said cycle clock in response to a gate cycle clock, said gated cycle clock gated on by a run latch set to a first state;

a second index circuit for incrementing said event counter in response to a first event signal;

a storage circuit for storing states of said trace signals in said N-storage locations of said trace array in response to a write enable of said trace array;

a start code circuit for storing a start code in said trace array in response to an occurrence of said first event signal;

an event storage circuit for storing a trace event address in response to occurrences of said first event signal, said trace event address corresponding to said trace storage address generated before said event counter is incremented; and a stop circuit for stopping said storing of states of said trace signals in response to a second event signal.

25. The apparatus of claim 24, wherein said combining circuit combines P low order bits of said event counter to form P high order bits of said M-bit address and selected (M minus P) low order bits of said cycle clock counter to form remaining (M minus P) bits of said M-bit address.

26. The apparatus of claim 25, wherein said trace array is partitioned into $2^P$-Banks where P is an integer less than M.

27. The apparatus of claim 26, wherein a valid Bank of said $2^P$-Banks has a corresponding Bank valid bit set to a logic one when said start code is written into any location within said valid Bank and said Bank valid bit of said valid Bank is set to a logic zero when stored states of said trace array within said valid Bank are read.

28. The apparatus of claim 27, further comprising:

a read circuit for reading said trace array from a trace storage address generated coincident with said second event signal until N of said trace storage addresses are read; and a recovery circuit for recovering stored states of said trace signals in a first-in first-out received order by saving and discarding said stored states of said trace array in response to said start codes, said trace event addresses, and said Bank valid bits.

29. The apparatus of claim 24, wherein said first and second event signals are generated in response to a logic combination of circuit states occurring within said system.

30. The apparatus of claim 24, wherein said start code is recorded at a location of said trace array corresponding to a trace storage address generated as the result of incrementing said event counter by an occurrence of said first event signal.

31. The apparatus of claim 24, wherein cycles of said cycle clock corresponds to operation cycles of said system.

32. An apparatus for analyzing system operations comprising:
- a writeable trace array, said trace array having N-storage locations, each of said N-storage locations selected by corresponding N-trace storage addresses;
- a coupling circuit operable to couple trace signals to said writeable trace array;
- an M-bit cycle clock counter; said M-bits of said M-bit cycle clock counter producing an M-bit address;
- a decode circuit for decoding said M-bit address to generate said N-trace storage addresses;
- an address circuit generating selected of said N-trace storage addresses by incrementing said cycle clock counter in response to a gated clock, said gated cycle clock gated on by a run latch set to a first state;
- a storage circuit for storing states of said trace signals in said N-storage locations of said trace array in response to a write enable of said trace array;
- a start code circuit for storing a start code in said trace array in response to a first event signal;
- a sequence circuit for determining a first sequence of received states of said trace signals;
- a compression code circuit for storing a compression code in said trace array in response to an occurrence of said first sequence;
- a time stamp code circuit for storing a time stamp code in said trace array in response to a repeated number of occurrences of said first sequence;
- a first stop circuit for stopping said gated cycle clock in response to an occurrence of said first sequence;
- a start circuit for starting said gated cycle clock in response to an occurrence of a second sequence of said received states of said trace signals; and
- a second stop circuit for stopping said storing of states of said trace signals in response to a second event signal.

33. The apparatus of claim 32, further comprising:
- read circuit for reading said N-locations of stored states of said trace signals from said trace array from a stop trace address corresponding to an occurrence of said second event signal;
- a decompress circuit for decompressing sequences of said stored states of said trace signals in response to said stored states of said trace signals, said start code, said compression code and said time stamp code; and
- a recover circuit for recovering states of said decompressed first signal states in a first-in first-out received order by saving and discarding stored states of said first trace array in response to said start code.

34. The apparatus of claim 32, wherein said decompression circuit further comprises:
- a repeat sequence circuit for repeating, for S-cycles, a state of said trace signal stored at an address immediately before an occurrence of said compression code, said S-cycles corresponding to a value of said time stamp code stored concurrent with said compression code.

35. A data processing system comprising:
- a central processing unit (CPU);
- random access memory (RAM);
- read only memory (ROM); and
- a bus system coupling said CPU to said ROM and said RAM, wherein said CPU further comprises:
  - a very large scale integrated (VLSI) chip, said VLSI chip comprising a debugging system for debugging circuits with said chip, said debugging system comprising;
  - a writeable trace array, said trace array having N-storage locations, each of said N-storage locations selected by corresponding N-trace storage addresses;
  - circuitry for coupling said trace signals to said writeable trace array;
  - circuitry configured as an M-bit cycle clock counter; said M-bits of said M-bit cycle clock counter producing an M-bit address;
  - circuitry for decoding said M-bit address to generate said N-trace storage addresses;
  - circuitry for generating selected of said N-trace storage addresses by incrementing said cycle clock counter in response to a gated cycle clock, wherein said gated cycle clock is gated on by a run latch set to a first state;
  - a storage circuit for storing states of said trace signals in said N-storage locations of said trace array in response to a write enable of said trace array;
  - circuitry for writing a start code in said trace array in response to a first event signal; and
  - a stop circuit for stopping said storing of states of said trace signals in response to a second event signal.

36. The data processing system of claim 35, further comprising:
- circuitry for reading N-locations of stored states of said trace signals from said trace array from a stop trace address corresponding to an occurrence of said second event signal; and
- circuitry for assembling stored states of said trace signals in a first-in first-out received order by saving and discarding said stored states of said trace array in response to said stored start code.

* * * * *